US012279105B2

(12) United States Patent
Mate et al.

(10) Patent No.: US 12,279,105 B2
(45) Date of Patent: Apr. 15, 2025

(54) METHOD AND APPARATUS FOR EFFICIENT DELIVERY OF EDGE BASED RENDERING OF 6DoF MPEG-I IMMERSIVE AUDIO

(71) Applicant: Nokia Technologies Oy, Espoo (FI)

(72) Inventors: Sujeet Shyamsundar Mate, Tampere (FI); Lasse Juhani Laaksonen, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 17/964,219

(22) Filed: Oct. 12, 2022

(65) Prior Publication Data

US 2023/0123809 A1 Apr. 20, 2023

(30) Foreign Application Priority Data

Oct. 15, 2021 (GB) ..................................... 2114785

(51) Int. Cl.
*H04S 7/00* (2006.01)
*G10L 19/008* (2013.01)

(52) U.S. Cl.
CPC ........... *H04S 7/303* (2013.01); *H04S 2400/11* (2013.01); *H04S 2420/03* (2013.01)

(58) Field of Classification Search
None
See application file for complete search history.

(56) References Cited

U.S. PATENT DOCUMENTS

| | | | | |
|---|---|---|---|---|
| 2020/0094141 A1* | 3/2020 | Fersch | .................... | H04S 7/302 |
| 2020/0178015 A1 | 6/2020 | Mcgrath | | |

FOREIGN PATENT DOCUMENTS

| | | | | |
|---|---|---|---|---|
| GB | 2577885 A | 4/2020 | | |
| GB | 2591066 A | 7/2021 | | |
| GB | 2592388 A | 9/2021 | | |
| JP | 2020524420 A | 8/2020 | | |
| JP | 2020174383 A * | 10/2020 | .......... | G10L 19/008 |
| JP | 2022552474 A | 12/2022 | | |
| WO | WO-2018/232327 A1 | 12/2018 | | |
| WO | WO-2021/069793 A1 | 4/2021 | | |
| WO | WO-2021/124903 A1 | 6/2021 | | |

* cited by examiner

*Primary Examiner* — Qin Zhu
(74) *Attorney, Agent, or Firm* — McCarter & English, LLP

(57) ABSTRACT

An apparatus for generating a spatialized audio output based on a user position, the apparatus including circuitry configured to: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

20 Claims, 8 Drawing Sheets

METHOD AND APPARATUS FOR EFFICIENT DELIVERY OF EDGE BASED RENDERING OF 6DoF MPEG-I IMMERSIVE AUDIO

FIELD

The present application relates to method and apparatus for efficient delivery of edge based rendering of 6 degree of freedom MPEG-I immersive audio, but not exclusively method and apparatus for efficient delivery of edge based rendering of 6 degree of freedom MPEG-I immersive audio to user equipment based renderers.

BACKGROUND

Modern cellular and wireless communication networks, such as 5G, have brought computational resources for various applications and services closer to the edge, which has provided impetus for mission critical network enabled applications and immersive multimedia rendering.

Furthermore these networks are reducing the delay and bandwidth constraint between edge computing layers and the end user media consumption devices such as mobile devices, HMDs (configured for augmented reality/virtual reality/mixed reality—AR/VR/XR applications), and tablets, significantly.

Ultra-low latency edge computing resources can be used by end user devices with end-to-end latencies which are less than 10 ms (e.g., and with latencies reported as low as 4 ms). Hardware accelerated SoCs (System on Chip) are increasingly being deployed on media edge computing platforms to exploit the rich and diverse multimedia processing applications for volumetric and immersive media (such as 6 degree-of-freedom—6DoF Audio). These trends have made employing edge computing based media encoding as well as edge computing based rendering as attractive propositions. Advanced media experiences can be made available to a large number of devices which may not have the capability to perform rendering for highly complex volumetric and immersive media.

The MPEG-I 6DoF audio format, which is being standardized in MPEG Audio WG06, can often be quite complex computationally, depending on the immersive audio scene. The processes of encoding, decoding and rendering a scene from the MPEG-I 6DoF audio format can in other words be computationally quite complex or demanding. For example, within a moderately complex scene rendering the audio for 2nd or 3rd order effects (such as modelling reflections of reflections from an audio source) can result in a large number of effective image sources. This makes not only rendering (which is implemented at a listener position dependent manner) but also encoding (which can occur offline) quite a complex proposition.

Additionally the immersive voice and audio services (IVAS) codec is an extension of the 3GPP EVS codec and intended for new immersive voice and audio services over communications networks such as described above. Such immersive services include, e.g., immersive voice and audio for virtual reality (VR). This multi-purpose audio codec is expected to handle the encoding, decoding and rendering of speech, music and generic audio. It is expected to support a variety of input formats, such as channel-based and scene-based inputs. It is also expected to operate with low latency to enable conversational services as well as support high error robustness under various transmission conditions. The standardization of the IVAS codec is currently expected to be completed by the end of 2022.

Metadata-assisted spatial audio (MASA) is one input format proposed for IVAS. It uses audio signal(s) together with corresponding spatial metadata (containing, e.g., directions and direct-to-total energy ratios in frequency bands). The MASA stream can, e.g., be obtained by capturing spatial audio with microphones of, e.g., a mobile device, where the set of spatial metadata is estimated based on the microphone signals. The MASA stream can be obtained also from other sources, such as specific spatial audio microphones (such as Ambisonics), studio mixes (e.g., 5.1 mix) or other content by means of a suitable format conversion. One such conversion method is disclosed in Tdoc S4-191167 (Nokia Corporation: Description of the IVAS MASA C Reference Software; 3GPP TSG-SA4 #106 meeting; 21-25 Oct. 2019, Busan, Republic of Korea).

SUMMARY

There is provided according to a first aspect an apparatus for generating a spatialized audio output based on a user position, the apparatus comprising means configured to: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

The means may be further configured to transmit the encoded at least one spatial parameter and the at least one audio signal to a further apparatus, wherein the further apparatus may be configured to output a binaural or multichannel audio signal based on processing the at least one audio signal, the processing based on the user rotation value and the at least one spatial audio rendering parameter.

The further apparatus may be operated by the user and the means configured to obtain a user position value may be configured to receive from the further apparatus the user position value.

The means configured to obtain the user position value may be configured to receive the user position value from a head mounted device operated by the user.

The means may be further configured to transmit the user position value.

The means configured to process the intermediate format immersive audio signal to obtain the at least one spatial parameter and the at least one audio signal may be configured to generate a metadata assisted spatial audio bitstream.

The means configured to encode the at least one spatial parameter and the at least one audio signal may be configured to generate an immersive voice and audio services bitstream.

The means configured to encode the at least one spatial parameter and the at least one audio signal may be configured to low latency encode the at least one spatial parameter and the at least one audio signal.

The means configured to process the intermediate format immersive audio signal to obtain the at least one spatial parameter and the at least one audio signal may be configured to: determine an audio frame length difference between the intermediate format immersive audio signal and the at least one audio signal; and control a buffering of the intermediate format immersive audio signal based on the determination of the audio frame length difference.

The means may be further configured to obtain a user rotation value, wherein the means configured to generate the intermediate format immersive audio signal may be configured to generate the intermediate format immersive audio signal further based on the user rotation value.

The means configured to generate the intermediate format immersive audio signal may be configured to generate the intermediate format immersive audio signal further based on a pre-determined or agreed user rotation value, wherein the further apparatus may be configured to output a binaural or multichannel audio signal based on processing the at least one audio signal, the processing based on an obtained user rotation value relative to the pre-determined or agreed user rotation value and the at least one spatial audio rendering parameter.

According to a second aspect there is provided an apparatus for generating a spatialized audio output based on a user position, the apparatus comprising means configured to: obtain a user position value and rotation value; obtain an encoded at least one audio signal and at least one spatial parameter, the encoded at least one audio signal based on an intermediate format immersive audio signal generated by processing an input audio signal based on the user position value; and generate an output audio signal based on processing in six-degrees-of-freedom the encoded at least one audio signal, the at least one spatial parameter and the user rotation value.

The apparatus may be operated by the user and the means configured to obtain a user position value may be configured to generate the user position value.

The means configured to obtain the user position value may be configured to receive the user position value from a head mounted device operated by the user.

The means configured to obtain the encoded at least one audio signal and at least one spatial parameter, may be configured to receive the encoded at least one audio signal and at least one spatial parameter from a further apparatus.

The means may be further configured to receive the user position value and/or user orientation value from the further apparatus.

The means may be configured to transmit the user position value and/or user orientation value to the further apparatus, wherein the further apparatus may be configured to generate an intermediate format immersive audio signal based on at least one input audio signal, determined metadata, and the user position value, and process the intermediate format immersive audio signal to obtain the at least one spatial parameter and the at least one audio signal.

The encoded at least one audio signal may be a low latency encoded at least one audio signal.

The intermediate format immersive audio signal may have a format selected based on an encoding compressibility of the intermediate format immersive audio signal.

According to a third aspect there is provided a method for an apparatus for generating a spatialized audio output based on a user position, the method comprising: obtaining a user position value; obtaining at least one input audio signal and associated metadata enabling a rendering of the at least one input audio signal; generating an intermediate format immersive audio signal based on the at least one input audio signal, the metadata, and the user position value; processing the intermediate format immersive audio signal to obtain the at least one spatial parameter and the at least one audio signal; and encoding the at least one spatial parameter and the at least one audio signal, wherein the at least one spatial parameter and the at least one audio signal are configured to at least in part generate the spatialized audio output.

The method may further comprise transmitting the encoded at least one spatial parameter and the at least one audio signal to a further apparatus, wherein the further apparatus may be configured to output a binaural or multichannel audio signal based on processing the at least one audio signal, the processing based on the user rotation value and the at least one spatial audio rendering parameter.

The further apparatus may be operated by the user and obtaining a user position value may comprise receiving from the further apparatus the user position value.

Obtaining the user position value may comprise receiving the user position value from a head mounted device operated by the user.

The method may further comprise transmitting the user position value.

Processing the intermediate format immersive audio signal to obtain the at least one spatial parameter and the at least one audio signal may comprise generating a metadata assisted spatial audio bitstream.

Encoding the at least one spatial parameter and the at least one audio signal may comprise generating an immersive voice and audio services bitstream.

Encoding the at least one spatial parameter and the at least one audio signal may comprise low latency encoding the at least one spatial parameter and the at least one audio signal.

Processing the intermediate format immersive audio signal to obtain the at least one spatial parameter and the at least one audio signal may comprise: determining an audio frame length difference between the intermediate format immersive audio signal and the at least one audio signal; and controlling a buffering of the intermediate format immersive audio signal based on the determination of the audio frame length difference.

The method may further comprise obtaining a user rotation value, wherein generating the intermediate format immersive audio signal may comprise generating the intermediate format immersive audio signal further based on the user rotation value.

Generating the intermediate format immersive audio signal may comprise generating the intermediate format immersive audio signal further based on a pre-determined or agreed user rotation value, wherein the further apparatus may be configured to output a binaural or multichannel audio signal based on processing the at least one audio signal, the processing based on an obtained user rotation value relative to the pre-determined or agreed user rotation value and the at least one spatial audio rendering parameter.

According to a fourth aspect there is provided a method for an apparatus for generating a spatialized audio output based on a user position, the method comprising: obtaining a user position value and rotation value; obtaining an encoded at least one audio signal and at least one spatial parameter, the encoded at least one audio signal based on an intermediate format immersive audio signal generated by processing an input audio signal based on the user position value; and generating an output audio signal based on processing in six-degrees-of-freedom the encoded at least one audio signal, the at least one spatial parameter and the user rotation value.

The apparatus may be operated by the user and obtaining a user position value may comprise generating the user position value.

Obtaining the user position value may comprise receiving the user position value from a head mounted device operated by the user.

Obtaining the encoded at least one audio signal and at least one spatial parameter, may comprise receiving the encoded at least one audio signal and at least one spatial parameter from a further apparatus.

The method may further comprise receiving the user position value and/or user orientation value from the further apparatus.

The method may comprise transmitting the user position value and/or user orientation value to the further apparatus, wherein the further apparatus may be configured to generate an intermediate format immersive audio signal based on at least one input audio signal, determined metadata, and the user position value, and process the intermediate format immersive audio signal to obtain the at least one spatial parameter and the at least one audio signal.

The encoded at least one audio signal may be a low latency encoded at least one audio signal.

The intermediate format immersive audio signal may have a format selected based on an encoding compressibility of the intermediate format immersive audio signal.

According to a fifth aspect there is provided an apparatus for generating a spatialized audio output based on a user position, the apparatus comprising at least one processor and at least one memory including a computer program code, the at least one memory and the computer program code configured to, with the at least one processor, cause the apparatus at least to: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

The apparatus may be further caused to transmit the encoded at least one spatial parameter and the at least one audio signal to a further apparatus, wherein the further apparatus may be configured to output a binaural or multichannel audio signal based on processing the at least one audio signal, the processing based on the user rotation value and the at least one spatial audio rendering parameter.

The further apparatus may be operated by the user and the apparatus caused to obtain a user position value may be caused to receive from the further apparatus the user position value.

The apparatus caused to obtain the user position value may be caused to receive the user position value from a head mounted device operated by the user.

The apparatus may be further caused to transmit the user position value.

The apparatus caused to process the intermediate format immersive audio signal to obtain the at least one spatial parameter and the at least one audio signal may be caused to generate a metadata assisted spatial audio bitstream.

The apparatus caused to encode the at least one spatial parameter and the at least one audio signal may be caused to generate an immersive voice and audio services bitstream.

The apparatus caused to encode the at least one spatial parameter and the at least one audio signal may be caused to low latency encode the at least one spatial parameter and the at least one audio signal.

The apparatus caused to process the intermediate format immersive audio signal to obtain the at least one spatial parameter and the at least one audio signal may be caused to: determine an audio frame length difference between the intermediate format immersive audio signal and the at least one audio signal; and control a buffering of the intermediate format immersive audio signal based on the determination of the audio frame length difference.

The apparatus may be further caused to obtain a user rotation value, wherein the apparatus caused to generate the intermediate format immersive audio signal may be caused to generate the intermediate format immersive audio signal further based on the user rotation value.

The apparatus caused to generate the intermediate format immersive audio signal may be caused to generate the intermediate format immersive audio signal further based on a pre-determined or agreed user rotation value, wherein the further apparatus may be configured to output a binaural or multichannel audio signal based on processing the at least one audio signal, the processing based on an obtained user rotation value relative to the pre-determined or agreed user rotation value and the at least one spatial audio rendering parameter.

According to a sixth aspect there is provided an apparatus for generating a spatialized audio output based on a user position, the apparatus comprising, the apparatus comprising at least one processor and at least one memory including a computer program code, the at least one memory and the computer program code configured to, with the at least one processor, cause the apparatus at least to: obtain a user position value and rotation value; obtain an encoded at least one audio signal and at least one spatial parameter, the encoded at least one audio signal based on an intermediate format immersive audio signal generated by processing an input audio signal based on the user position value; and generate an output audio signal based on processing in six-degrees-of-freedom the encoded at least one audio signal, the at least one spatial parameter and the user rotation value.

The apparatus may be operated by the user and the apparatus caused to obtain a user position value may be configured to generate the user position value.

The apparatus caused to obtain the user position value may be caused to receive the user position value from a head mounted device operated by the user.

The apparatus caused obtain the encoded at least one audio signal and at least one spatial parameter, may be caused to receive the encoded at least one audio signal and at least one spatial parameter from a further apparatus.

The apparatus may be further caused to receive the user position value and/or user orientation value from the further apparatus.

The apparatus may be caused to transmit the user position value and/or user orientation value to the further apparatus, wherein the further apparatus may be configured to generate an intermediate format immersive audio signal based on at least one input audio signal, determined metadata, and the user position value, and process the intermediate format immersive audio signal to obtain the at least one spatial parameter and the at least one audio signal.

The encoded at least one audio signal may be a low latency encoded at least one audio signal.

The intermediate format immersive audio signal may have a format selected based on an encoding compressibility of the intermediate format immersive audio signal.

According to a seventh aspect there is provided an apparatus for generating a spatialized audio output based on a user position, the apparatus comprising: means for obtaining a user position value; means for obtaining at least one input audio signal and associated metadata enabling a rendering of the at least one input audio signal; means for generating an intermediate format immersive audio signal based on the at least one input audio signal, the metadata, and the user position value; means for processing the intermediate format immersive audio signal to obtain the at least one spatial parameter and the at least one audio signal; and means for encoding the at least one spatial parameter and the at least one audio signal, wherein the at least one spatial parameter and the at least one audio signal are configured to at least in part generate the spatialized audio output.

According to an eighth aspect there is provided an apparatus for generating a spatialized audio output based on a user position, the apparatus comprising: means for obtaining a user position value and rotation value; means for obtaining an encoded at least one audio signal and at least one spatial parameter, the encoded at least one audio signal based on an intermediate format immersive audio signal generated by processing an input audio signal based on the user position value; and means for generating an output audio signal based on processing in six-degrees-of-freedom the encoded at least one audio signal, the at least one spatial parameter and the user rotation value.

According to a ninth aspect there is provided a computer program comprising instructions [or a computer readable medium comprising program instructions] for causing an apparatus, for generating a spatialized audio output based on a user position, to perform at least the following: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

According to a tenth aspect there is provided a computer program comprising instructions [or a computer readable medium comprising program instructions] for causing an apparatus to perform at least the following: obtain a user position value and rotation value; obtain an encoded at least one audio signal and at least one spatial parameter, the encoded at least one audio signal based on an intermediate format immersive audio signal generated by processing an input audio signal based on the user position value; and generate an output audio signal based on processing in six-degrees-of-freedom the encoded at least one audio signal, the at least one spatial parameter and the user rotation value.

According to an eleventh aspect there is provided a non-transitory computer readable medium comprising program instructions for causing an apparatus to perform at least the following: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

According to a twelfth aspect there is provided a non-transitory computer readable medium comprising program instructions for causing an apparatus to perform at least the following: an apparatus for generating a spatialized audio output based on a user position, the apparatus comprising means configured to: obtain a user position value and rotation value; obtain an encoded at least one audio signal and at least one spatial parameter, the encoded at least one audio signal based on an intermediate format immersive audio signal generated by processing an input audio signal based on the user position value; and generate an output audio signal based on processing in six-degrees-of-freedom the encoded at least one audio signal, the at least one spatial parameter and the user rotation value.

According to a thirteenth aspect there is provided an apparatus comprising: obtaining circuitry configured to obtain a user position value; obtaining circuitry configured to obtain at least one input audio signal and associated metadata enabling a rendering of the at least one input audio signal; generating circuitry configured to generate an intermediate format immersive audio signal based on the at least one input audio signal, the metadata, and the user position value; processing circuitry configured to process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

According to a fourteenth aspect there is provided an apparatus comprising: obtaining circuitry configured to obtain a user position value and rotation value; obtaining circuitry configured to obtain an encoded at least one audio signal and at least one spatial parameter, the encoded at least one audio signal based on an intermediate format immersive audio signal generated by processing an input audio signal based on the user position value; and generating circuitry configured to generate an output audio signal based on processing in six-degrees-of-freedom the encoded at least one audio signal, the at least one spatial parameter and the user rotation value.

According to a fifteenth aspect there is provided a computer readable medium comprising program instructions for causing an apparatus to perform at least the following: obtain a user position value; obtain at least one input audio signal and associated metadata enabling a rendering of the at least one input audio signal; generate an intermediate format immersive audio signal based on the at least one input audio signal, the metadata, and the user position value; process the intermediate format immersive audio signal to obtain the at least one spatial parameter and the at least one audio signal; and encode the at least one spatial parameter and the at least one audio signal, wherein the at least one spatial parameter and the at least one audio signal are configured to at least in part generate the spatialized audio output.

According to a sixteenth aspect there is provided a computer readable medium comprising program instructions for causing an apparatus to perform at least the following: obtain a user position value and rotation value; obtain an encoded at least one audio signal and at least one spatial parameter, the encoded at least one audio signal based on an intermediate format immersive audio signal generated by processing an input audio signal based on the user position value; and generate an output audio signal based on processing in six-degrees-of-freedom the encoded at least one audio signal, the at least one spatial parameter and the user rotation value.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1A:
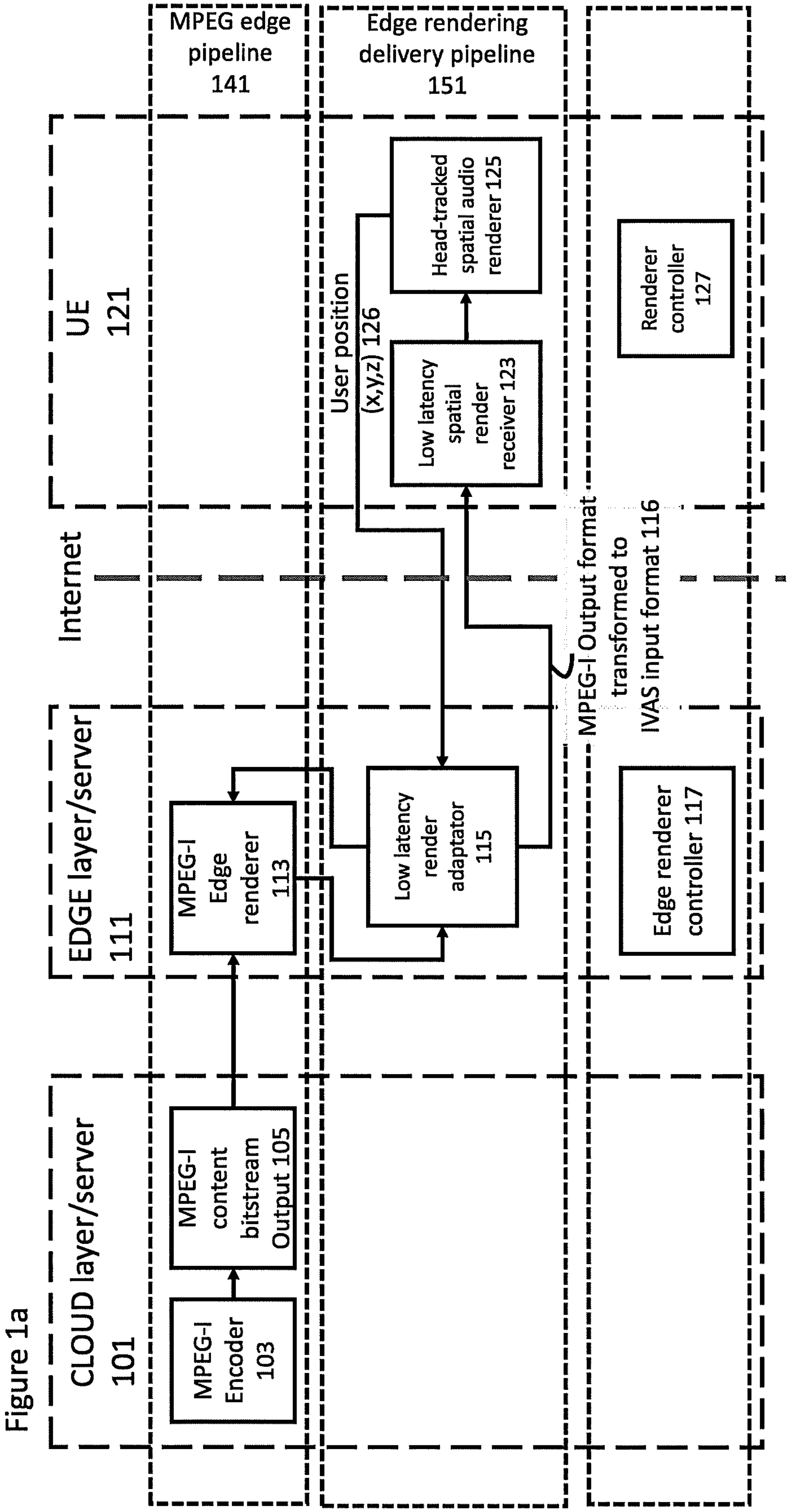
FIGS. 1*a* and 1*b* shows schematically a suitable system of apparatus within which some embodiments may be implemented.

The following describes in further detail suitable apparatus and possible mechanisms for efficient delivery of edge based rendering of 6DoF MPEG-I immersive audio.

Acoustic modelling such as early reflections modelling, diffraction, occlusion, extended sources rendering as described above can become computationally very demanding even for moderately complex scenes. For example, attempting to render large scenes (i.e. scenes with a large number of reflecting elements) and implementing early reflections modelling for second or higher order reflections in order to produce an output with a high degree of plausibility is very resource intensive. Thus there is significant benefit, for a content creator, in defining in a 6DoF scene, the flexibility for rendering complex scenes. This is all the more important in case the rendering device may not have the resources to provide a high-quality rendering.

A solution to this rendering device resource issue is the provision for rendering of complex 6DoF Audio scenes in the edge. In other words using an edge computing layer to provide physics or perceptual acoustics based rendering for complex scenes with high degree of plausibility.

In the following a complex 6DoF scene refers to 6DoF scenes with large number of sources (which may be static or dynamic, moving sources) as well as scenes comprising complex scene geometry having multiple surfaces or geometric elements with reflection, occlusion and diffraction properties.

The application of edge based rendering assists by enabling offloading of the computational resources required to render the scene and thus enables the consumption of highly complex scenes even with devices having limited computing resources. This results in a wider target addressable market for MPEG-I content.

The challenge with such an edge rendering approach is to deliver the rendered audio to the listener in an efficient manner so that it retains plausibility and immersion while ensuring that it is responsive to the change in listener orientation and position.

Edge rendering an MPEG-I 6DOF Audio format requires configuration or control which differs from conventional rendering at the consumption device (such as on HMD, Mobile phone or AR glasses). 6DOF content when consumed on a local device via headphones is set to a headphone output mode. However, headphone output is not optimal for transforming to spatial audio format such as MASA (Metadata Assisted Spatial Audio), which is one of the proposed input formats for IVAS. Thus, even though the end point consumption is headphones, the MPEG-I renderer output cannot be configured to output to "headphones" if consumed via IVAS assisted edge rendering.

There is therefore a need to have a bitrate efficient solution to enable edge based rendering while retaining spatial audio properties of the rendered audio and maintaining a responsive perceived motion to ear latency. This is crucial because the edge based rendering needs to be practicable over real world networks (with bandwidth constraints) and the user should not experience a delayed response to change in user's listening position and orientation. This is required to maintain 6DoF immersion and plausibility. The motion to ear latency in the following disclosure is the time required to effect a change in the perceived audio scene based on a change in head motion.

Current approaches have attempted to provide entirely prerendered audio with late correction of audio frames based on head orientation change which may be implemented in the edge layer rather than the cloud layer. The concept thus as discussed in the embodiments herein is one or providing apparatus and methods configured to provide distributed free-viewpoint audio rendering, where a pre-rendering is performed in a first instance (network edge layer) based on user's 6DoF position in order to provide for efficient transmission and rendering a perceptually motivated transformation to 3DoF spatial audio, which is rendered binaurally to user based on user's 3DoF orientation in a second instance (UE).

The embodiments as discussed herein thus extend the capability of the UE (e.g., adding support for 6DoF audio rendering), allocates highest-complexity decoding and rendering to the network, and allows for efficient high-quality transmission and rendering of spatial audio, while achieving lower motion-to-sound latency and thus more correct and natural spatial rendering according to user orientation than what is achievable by rendering on the network edge alone.

In the following disclosure edge rendering refers to performing rendering (at least partly) on a network edge layer based computing resource which is connected to a suitable consumption device via a low-latency (or ultra low-latency) data link. For example, a computing resource in proximity to the gNodeB in a 5G cellular network.

The embodiments herein further in some embodiments relate to distributed 6-degree-of-freedom (i.e., the listener can move within the scene and the listener position is tracked) audio rendering and delivery where a method is proposed that uses a low-latency communication codec to encode and transmit a 3DoF immersive audio signal produced by a 6DoF audio renderer for achieving bitrate efficient low latency delivery of the partially rendered audio while retaining spatial audio cues and maintaining a responsive motion to ear latency.

In some embodiments this is achieved by obtaining user position (for example by receiving a position from UE), obtaining at least one audio signal and metadata enabling 6DoF rendering of the at least one audio signal (MPEG-I EIF), using the at least one audio signal, the metadata, and the user head position, and rendering an immersive audio signal (MPEG-I rendering into HOA or LS).

The embodiments furthermore describe processing the immersive audio signal to obtain at least one spatial parameter and at least one audio transport signal (for example as part of a metadata assisted spatial audio—MASA format), and encoding and transmitting the at least one spatial parameter and the at least one transport signal using an audio codec (such as an IVAS based codec) with a low latency to another device.

In some embodiments on the other device the user head orientation (UE head tracking) can be obtained and using the user head orientation and the at least one spatial parameter, and rendering the at least one transport signal into a binaural output (for example rendering the IVAS format audio to a suitable binaural audio signal output).

In some embodiments the audio frame length for rendering the immersive audio signal is determined to be the same as the low latency audio codec.

Additionally in some embodiments, if the audio frame length of the immersive audio rendering cannot be the same as the low latency audio codec, a FIFO buffer is instantiated to accommodate excess samples. For example, EVS/IVAS expects 960 samples every 20 ms frame, which corresponds to 240 samples. If MPEG-I operates at 240 samples frame length, then it is in lock step and there is no additional intermediate buffering. If MPEG-I operates at 256 additional buffering is needed.

In some further embodiments user position changes are delivered to the renderer at more than a threshold frequency and with lower than a threshold latency to obtain acceptable user translation to sound latency.

In such a manner the embodiments enable resource constrained devices to consume highly complex scenes 6-degree-of-freedom immersive audio scenes. In absence of this such consumption would only be feasible with consumption devices equipped with significant computational resources and the proposed method thus enables the consumption on devices with lower power requirements.

Furthermore, these embodiments enable rendering the audio scene with greater detail compared to rendering with limited computational resources.

Head motion in these embodiments is reflected immediately in the "on-device" rendering of low latency spatial audio. The listener translation is reflected as soon as the listener position is relayed back to the edge renderer.

Furthermore, even complex virtual environments, which can be dynamically modified, can be virtual acoustic simulated with high quality on resource constrained consumption devices such as AR glasses, VR glasses, Mobile devices, etc.

Figure 1B:
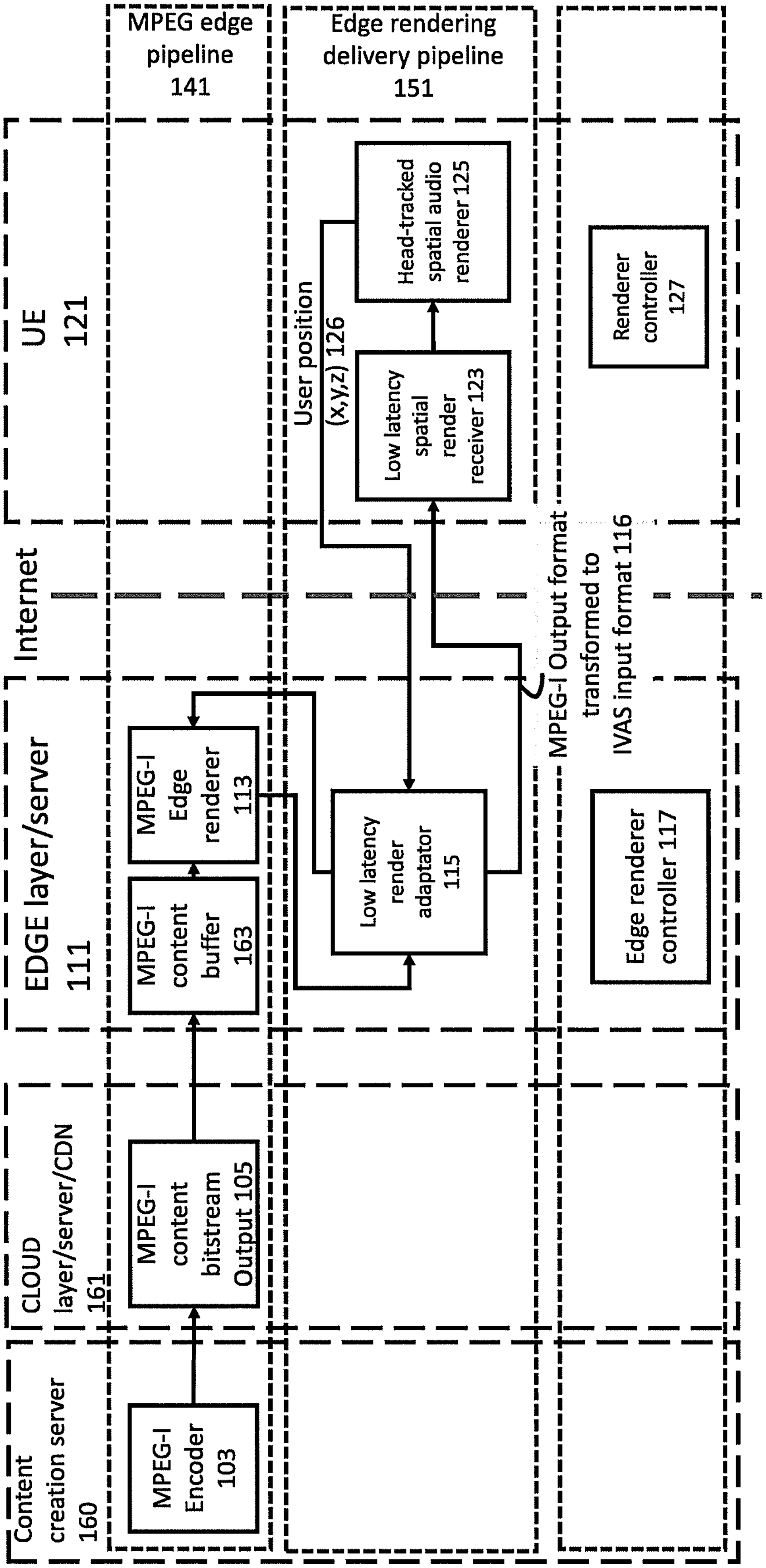

With respect to FIGS. 1*a* and 1*b* are shown example systems within which embodiments may be implemented. This high level overview of the end-to-end system for edge based rendering can be broken into three main parts, with respect to FIG. 1*a* of the system. These three parts are the cloud layer/server 101, the edge layer/server 111 and the UE 121 (or user equipment). Furthermore the high level overview of the end-to-end system for edge based rendering can be broken into four parts, with respect to FIG. 1*b* of the system where the cloud layer/server 101 is divided into content creation server 160 and cloud layer/server/CDN 161. The example in FIG. 1*b* indicates that the content creation and encoding can occur in a separate server and the generated bitstream is stored or hosted in a suitable cloud server or CDN to be accessed by the edge renderer depending on the UE location. The cloud layer/server 101 with respect to the end-to-end system for edge based rendering can be proximate or independent of the UE location in the network. The cloud layer/server 101 is the location or entity where the 6DoF audio content is generated or stored. In this example the cloud layer/server 101 is configured to generate/store the audio content in a MPEG-I Immersive Audio for 6DoF audio format.

In some embodiments therefore the cloud layer/server 101 as shown in FIG. 1*a* comprises a MPEG-I encoder 103 and in FIG. 1*b* the content creation server 160 comprises the MPEG-I encoder 103. The MPEG-I encoder 103 is configured to generate the MPEG-I 6DoF audio content with the help of the content creator scene description or encoder input format (EIF) file, the associated audio data (raw audio files and MPEG-H coded audio files).

Furthermore the cloud layer/server 101 comprises a MPEG-I content bitstream output 105 as shown in FIG. 1*a*, wherein as shown in FIG. 1*b* the cloud layer/server/CDN 161 comprises the MPEG-I content bitstream output 105. The MPEG-I content bitstream output 105 is configured to output or stream the MPEG-I encoder output as a MPEG-I content bitstream, over any available or suitable internet protocol (IP) network or any other suitable communications network.

The edge layer/server 111 is the second entity in the end to end system. The edge based computing layer/server or node is selected based on the UE location in the network. This enables provisioning of minimal data link latency between the edge computer layer and end-user consumption device (the UE 121). In some scenarios, the edge layer/server 111 can be collocated with the base station (e.g., gNodeB) to which the UE 121 is connected, which may result in minimal end to end latency.

In some embodiments, such as shown in FIG. 1*b*, where the cloud layer/server/CDN 161 comprises the MPEG-I content bitstream output 105, the edge server 111 comprises an MPEG-I content buffer 163 to store the MPEG-I content bitstream (i.e. 6DoF audio scene bitstream) which it retrieves from the cloud or CDN 161. The edge layer/server 111 in some embodiments comprises a MPEG-I edge renderer 113. The MPEG-I edge renderer 113 is configured to obtain the MPEFG-I content bitstream from the cloud layer/server output 105 (or cloud layer/server generally) or MPEG-I content buffer 163 and further configured to obtain from a low latency render adaptor 115 information about the user position (or more generally the consumption device or UE position). The MPEG-I edge renderer 113 is configured to render the MPEG-I content bitstream depending on the user position (x,y,z) information.

The edge layer/server 111 further comprises a low latency render adaptor 115. The low latency render adaptor 115 is configured to receive the output of the MPEG-I edge renderer 113 and transform the MPEG-I rendered output to a format which is suitable for efficient representation for low latency delivery which can then be output to the consumption device or UE 121. The low latency render adaptor 115 is thus configured to transform the MPEG-I output format to an IVAS input format 116.

In some embodiments, low latency render adaptor 115 can be another stage in the 6DoF audio rendering pipeline. Such an additional render stage can generate output which is natively optimized as input for a low latency delivery module.

In some embodiments the edge later/server 111 comprises an edge render controller 117 which is configured to perform the necessary configuration and control of the MPEG-I edge renderer 113 according to the renderer configuration information received from a player application in the UE 121.

In these embodiments the UE 121 is the consumption device used by the listener of the 6DoF audio scene. The UE 121 can be any suitable device. For example, the UE 121 may be a mobile device, a head mounted device (HMD), augmented reality (AR) glasses or headphones with head tracking. The UE 121 is configured to obtain a user position/orientation. For example in some embodiments the UE 121 is equipped with head tracking and position tracking to determine the user's position when the user is consuming 6DoF content. The user's position 126 in the 6DOF scene is delivered from the UE to the MPEG-I edge renderer (via the low latency render adaptor 115) situated in the edge layer/server 111 to impact the translation or change in position for 6DoF rendering.

In some embodiments in some embodiments comprises a low latency spatial render receiver 123 configured to receive the output of the low latency render adaptor 115 and pass this to the head-tracked spatial audio renderer 125.

The UE 121 furthermore may comprise a head-tracked spatial audio renderer 125. The head-tracked spatial audio renderer 125 is configured to receive the output of the low latency spatial render receiver 123 and the user head rotation information and based on there generate a suitable output audio rendering. The head-tracked spatial audio renderer 125 is configured to implement the 3DOF rotational freedom for which listeners are typically more sensitive.

The UE 121 in some embodiments comprises a renderer controller 127. The renderer controller 127 is configured to initiate the configuration and control of the edge renderer 113.

With respect to the Edge renderer 113 and low latency render adaptor 115 there follows some requirements for implementing edge based rendering of MPEG-6DoF audio content and delivering it to the end user who may be connected via a low latency high bandwidth link such as a 5G ULLRC (ultra low latency reliable communication) link.

In some embodiments the temporal frame length of the MPEG-I 6DoF audio rendering is aligned with the low latency delivery frame length in order to minimize any intermediate buffering delays. For example, if the low latency transfer format frame length is 240 samples (with sampling rate 48 KHz), in some situations, the MPEG-I renderer 113 is configured to operate at audio frame length of 240 samples. This for example is shown in FIG. 2 by the top half of the figure wherein the MPEG-I output 201 is at 240 samples per frame and the IVAS input 203 is also 240 samples per frame and wherein there is no frame length conversion or buffering.

Figure 2:
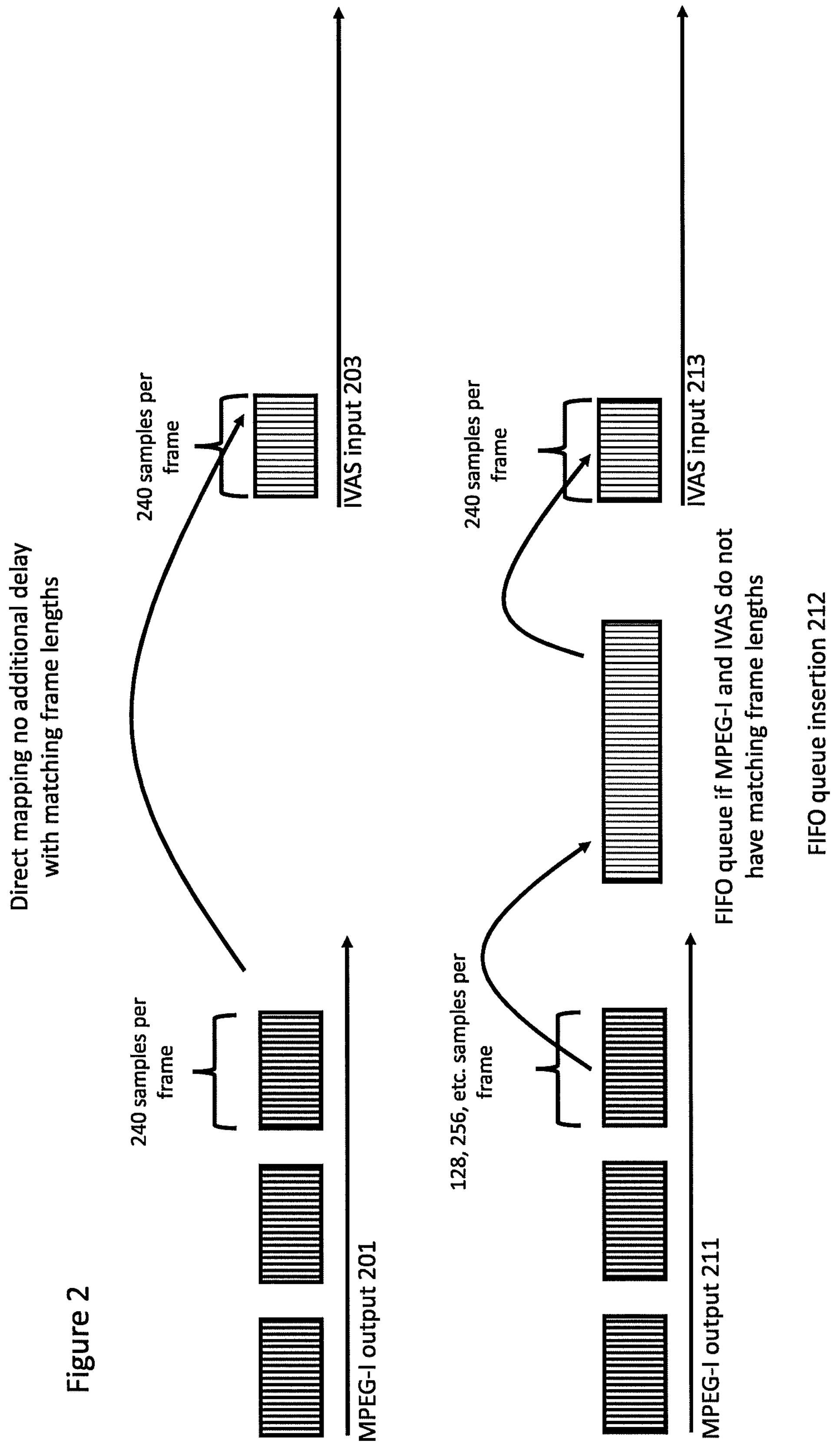
FIG. 2 shows schematically example conversions between MPEG-I and IVAS frame rates.

Thus for example in the lower part of FIG. 2 the MPEG-I output 211 is at 128, 256 samples per frame and the IVAS input 213 is 240 samples per frame. In these embodiments a FIFO buffer 212 may be inserted wherein the input is from the MPEG-I output and the output to the IVAS input 213 thus there is frame length conversion or buffering implemented.

In some embodiments the MPEG-I 6DoF audio should be rendered, if required, to an intermediate format instead of the default listening mode specified format. The need for rendering to an intermediate format is to retain the important spatial properties of the renderer output. This enables faithful reproduction of the rendered audio with the necessary spatial audio cues when transforming to a format which is better suited for efficient and low latency delivery. This can thus in some embodiments maintain listener plausibility and immersion.

In some embodiments the configuration information from the renderer controller 127 to the edge renderer controller 117 is in the following data format:

```
aligned(8) 6DoFAudioRenderingModeStruct( ){
  unsigned int(2) listening_mode;
  unsigned int(4) rendering_mode;
  unsigned int(32) 6dof_audio_frame_length;
  unsigned int(32) sampling rate;
  unsigned int(4) intermediate_format_type;
  unsigned int(4) low_latency_transfer_format;
  unsigned int(32) low_latency_transfer_frame_length;
}
```

In some embodiments the listening_mode variable (or parameter) defines the end user listener method of consuming the 6DOF audio content. This can in some embodiments have the values defined in the table below.

| listening_mode | Value |
|---|---|
| 0 | Headphone |
| 1 | Loudspeaker |
| 2 | Headphone and Loudspeaker |
| 3 | Reserved |

In some embodiments the rendering_mode variable (or parameter) defines the method for utilizing the MPEG-I renderer. The default mode when not specified or if the value rendering_mode value can be 0, and the MPEG-I rendering is performed locally. The MPEG-I edge renderer is configured to perform edge based rendering with efficient low latency delivery when the rendering_mode value is 1. In this mode, the low latency render adaptor 115 is also employed. If the rendering_mode value is 2, edge based rendering is implemented and the low latency render adaptor 115 is also employed.

However when the rendering_mode value is 1, an intermediate format is required to enable faithful reproduction of spatial audio properties while transferring audio over low latency efficient delivery mechanism, because it involves further encoding and decoding with low latency codec. On the other hand, if the rendering_mode value is 2, the renderer output is generated according to the listening_mode value without any further compression.

Thus, the direct format value of 2 is useful for networks where there is sufficient bandwidth and ultra low latency network delivery pipe (e.g., in case of dedicated network slice with 1-4 ms transmission delay). The method utilized in indirect format where the rendering_mode value is 1 is suitable for a network with greater bandwidth constraints with low latency transmission.

| rendering_mode | Value |
|---|---|
| 0 | Local rendering |
| 1 | Edge based rendering with efficient low latency delivery |
| 2 | Edge based rendering with headphone streaming |
| 3 | Reserved |

6dof_audio_frame_length is the operating audio buffer frame length for ingestion and delivered as output. This can be represented in terms of number of samples. Typical values are 128, 240, 256, 512, 1024, etc.

In some embodiments the sampling_rate variable (or parameter) indicates the value of the audio sampling rate per second. Some example values can be 48000, 44100, 96000, etc. In this example, a common sampling rate is used for the MPEG-I renderer as well as the low latency transfer. In some embodiments, each could have a different sampling rate.

In some embodiments the low_latency_transfer_format variable (or parameter) indicates the low latency delivery codec. This can be any efficient representation codec for spatial audio suitable for low latency delivery.

In some embodiments the low_latency_transfer_frame_length variable (or parameter) indicates the low latency delivery codec frame length in terms of number of samples. The low latency transfer format and the frame length possible values are indicated in the following:

| low_latency_ format_type | Value | low_latency_transfer_ frame_length |
|---|---|---|
| 0 | IVAS | 240 |
| 1 | EVS | 240 |
| 2-3 | Reserved | |

In some embodiments the intermediate_format_type variable (or parameter) indicates the type of audio output to be configured for the MPEG-I renderer when the rendering_mode needs to be transformed to another format for any reason. One such motivation can be to have the format which is suitable for subsequent compression without reduction in spatial properties. For example, efficient representation for low latency delivery i.e. rendering_mode value as 1. In some embodiments there could be other motivations for transforming which are discussed in more detail in the following.

In some embodiments the end user listening mode influences the audio rendering pipeline configuration and the constituent rendering stages. For example, when the desired audio output is to headphones, the final audio output can be directly synthesized as binaural audio. In contrast, for loudspeaker output, the audio rendering stages are configured to generate loudspeaker output without the binaural rendering stage.

In some embodiments and depending on the type of rendering_mode, the output of the 6DoF audio renderer (or MPEG-I immersive audio renderer) may be different from the listening_mode. In such embodiments the renderer is configured to render the audio signals based on the intermediate_format_type variable (or parameter) to facilitate retaining the salient audio characteristics of the MPEG-I renderer output when it is delivered via a low latency efficient delivery format. For example the following options may be employed

| intermediate_format_type | Value |
|---|---|
| 0 | Loudspeaker |
| 1 | HOA |
| 2 | MASA |
| 3 | Reserved |

Example intermediate_format_type variable (or parameter) options for enabling edge based rendering of 6DoF audio can for example be as follows:

| rendering_mode | listening_mode value | intermediate_format_type value |
|---|---|---|
| 0 | Loudspeaker | NA |
| 0 | Headphone | NA |
| 1 | Headphone | Loudspeaker |
| 1 | Headphone | HOA |
| 1 | Loudspeaker | Loudspeaker |
| 1 | Loudspeaker | HOA |
| 2 | Headphone | Headphone |
| 2 | Loudspeaker | Loudspeaker |

Figure 3:
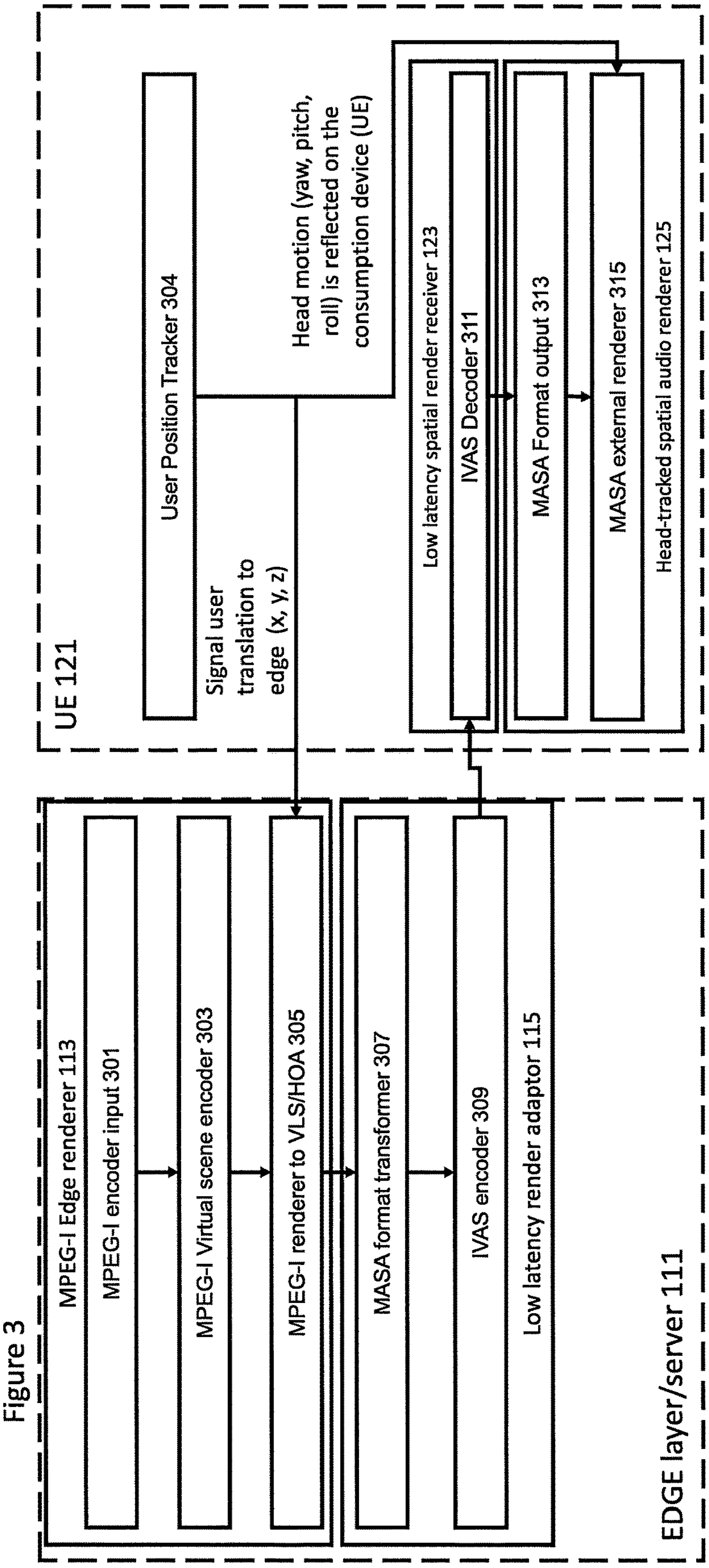
FIG. 3 shows schematically edge layer and user equipment apparatus suitable for implementing some embodiments.
Figure 4:
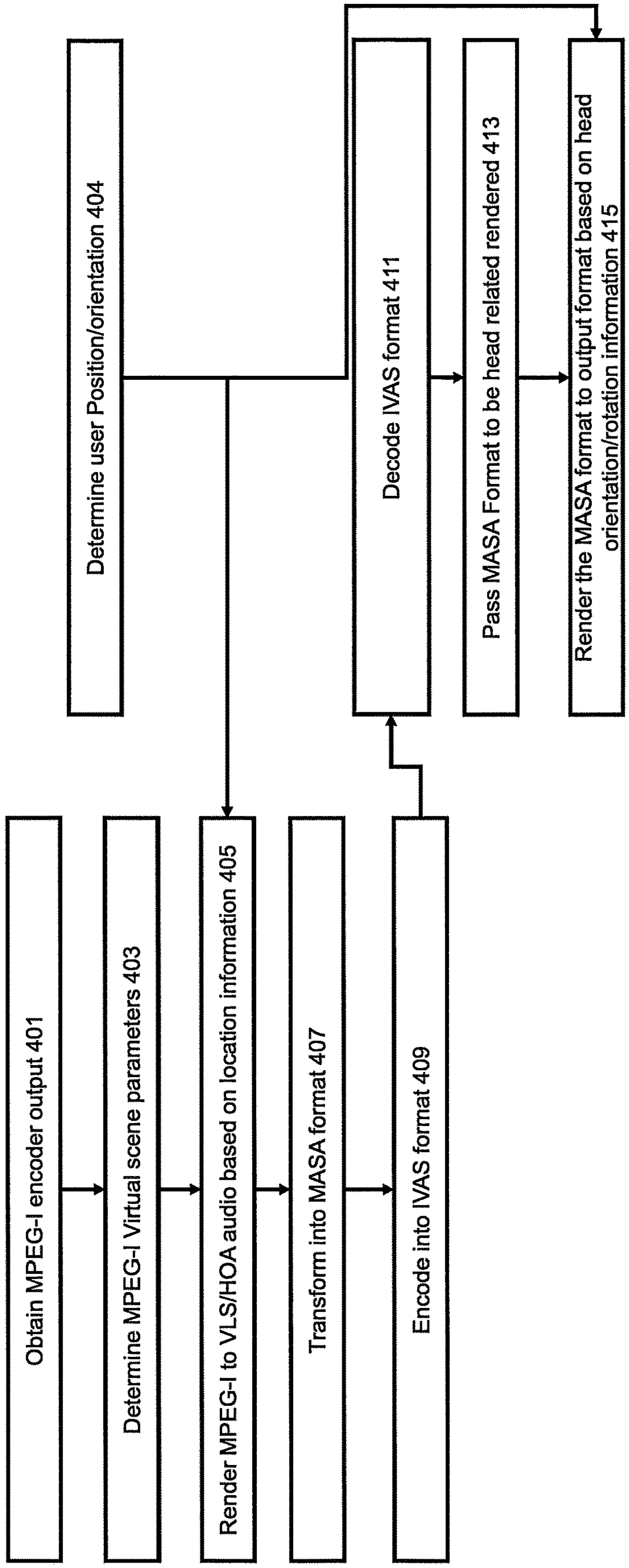
FIG. 4 shows a flow diagram of an example operation of the edge layer and user equipment apparatus as shown in FIG. 3 according to some embodiments.

FIGS. 3 and 4 presents example apparatus and flow diagrams for edge based rendering of MPEG-I 6DoF audio content with head tracked audio rendering.

In some embodiments the EDGE layer/server MPEG-I Edge renderer 113 comprises a MPEG-I encoder input 301 which is configured to receive as an input the MPEG-I encoded audio signals and pass this to the MPEG-I virtual scene encoder 303.

Furthermore in some embodiments the EDGE layer/server MPEG-I Edge renderer 113 comprises a MPEG-I virtual scene encoder 303 which is configured to receive the MPEG-I encoded audio signals and extract the virtual scene modelling parameters.

The EDGE layer/server MPEG-I Edge renderer 113 further comprises a MPEG-I renderer to VLS/HOA 305. The MPEG-I renderer to VLS/HOA is configured to obtain the virtual scene parameters and the MPEG-I audio signals and further the signal user translation from the user position tracker 304 and generate the MPEG-I rendering in a VLS/HOA format (even for a headphone listening by the listener). The MPEG-I rendering is performed for the initial listener position.

The Low latency render adaptor 115 furthermore comprises a MASA format transformer 307. The MASA format transformer 307 is configured to transform the rendered MPEG-I audio signals into a suitable MASA format. This can then be provided to a IVAS encoder 309.

The Low latency render adaptor 115 furthermore comprises a IVAS encoder 309. The IVAS encoder 309 is configured to generate a coded IVAS bitstream.

In some embodiments encoded IVAS bitstream is provided to an IVAS decoder 311 over an IP link to the UE.

The UE 121 in some embodiments comprises the low latency spatial render receiver 123 which in turn comprises an IVAS decoder 311 configured to decode the IVAS bitstream and output it as a MASA format.

In some embodiments the UE 121 comprises the head tracked spatial audio renderer 125 which in turn comprises a MASA format input 313. The MASA format input receives output of the IVAS decoder and passes it to the MASA external renderer 315.

Furthermore the head tracked spatial audio renderer 125 in some embodiments comprises a MASA external renderer 315 configured to obtain the head motion information from a user position tracker 304 and render the render the suitable output format (for example a binaural audio signal for headphones). The MASA external renderer 315 is configured to support 3DoF rotational freedom with minimal perceivable latency due to local rendering and headtracking. The user translation information as position information is delivered back to the edge based MPEG-I renderer. The position information and optionally rotational of the listener in the 6DoF audio scene in some embodiments is delivered as an RTCP feedback message. In some embodiments, the edge based rendering delivers rendered audio information to the UE. This enables the receiver to realign the orientations before switching to the new translation position.

With respect to FIG. 4 the example operations of the apparatus in FIG. 3 is shown.

First is obtained the MPEG-I encoder output as shown in FIG. 4 by step 401.

Then the virtual scene parameters are determined as shown in FIG. 4 by step 403.

The user position/orientation is obtained as shown in FIG. 4 by step 404.

The MPEG-I audio is then rendered as a VLS/HOA format based on the virtual scene parameters and the user position as shown in FIG. 4 by step 405.

The VLS/HOA format rendering is the transformed into a MASA format as shown in FIG. 4 by step 407.

The MASA format is IVAS encoded as shown in FIG. 4 by step 409.

The IVAS encoded (part-rendered) audio is then decoded is shown in FIG. 4 by step 411.

The decoded IVAS audio is then passed to the head (rotation) related rendering as shown in FIG. 4 by step 413.

Then the decoded IVAS audio is head (rotation) related rendered based on the user/head rotation information as shown in FIG. 4 by step 415.

Figure 5:
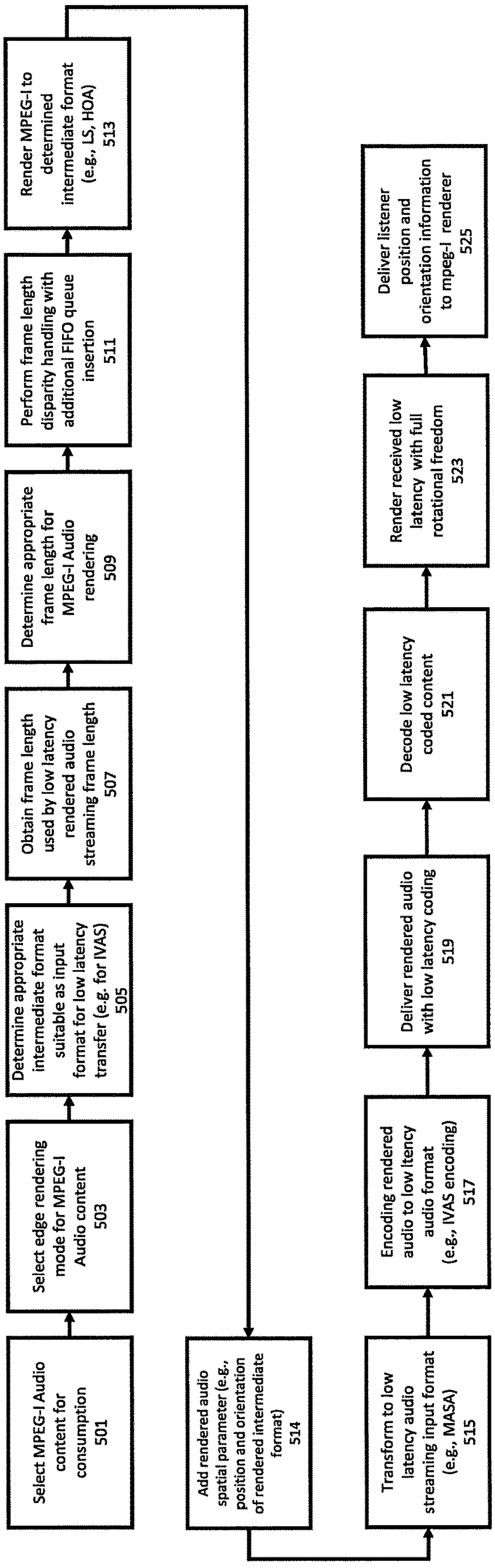
FIG. 5 shows a flow diagram of example operations of the system as shown in FIG. 2 according to some embodiments.

With respect to FIG. 5 is shown a flow diagram of the operation of the apparatus of FIGS. 3 and 1 in further detail.

In a first operation as shown in FIG. 5 by step 501, the end user selects the 6DoF audio content to be consumed. This can be represented by a URL pointer to the 6DOF content bitstream and an associated manifest (e.g., MPD or Media Presentation Description).

Then as shown in FIG. 5 by step 503 (UE renderer controller) in some embodiments selects the render_mode which can be, for example, 0 or 1 or 2. If the render_mode value 0 is selected, the MPD can be used to retrieve the MPEG-I 6DoF content bitstream and render it with the renderer on the UE. If the render mode value 1 or 2 is selected, the edge based renderer is required to be configured. The required information such as the render_mode, low_latency_transfer_format and associated low_latency_transfer_frame_length is signaled to the edge renderer controller. In addition, the end user consumption method i.e. listener_mode can be also signaled.

The UE may be configured to deliver configuration information represented by the following structure:

```
aligned(8) 6DoFAudioRenderingUEInfoStruct( ){
unsigned int(2) listening_mode;
unsigned int(4) rendering_mode;
unsigned int(32) sampling_rate;
unsigned int(4) low latency transfer format;
unsigned int(32) low_latency_transfer_frame_length;
}
```

As shown in FIG. 5 by step 505 (the edge renderer controller) determines the appropriate intermediate format as the output format of the MPEG-I renderer in order to minimize loss of spatial audio properties while transforming to the low latency transfer format. The different possible interim formats are listed above as are the choices of appropriate interim formats.

Furthermore as shown in FIG. 5 by steps 507 and 509 in some embodiments the method (the edge renderer controller) obtains the supported temporal frame length information from the MPEG-I renderer (6dof_audio_frame_length) and the low latency transfer format (low_latency_transfer_frame_length).

Subsequently as shown in FIG. 5 by step 511 an appropriate queueing mechanism is implemented (e.g., FIFO queue) in order handle the disparity in the audio frame lengths (where it has been determined to occur). It should be noted that the low latency transfer needs to have a tighter constraint of operation compared to the MPEG-I renderer in order to perform successful delivery of 17 audio frames for every 16 MPEG-I renderer output frames. For example where MPEG-I renderer has a frame length 256 samples whereas IVAS frame length is only 240 samples. In the period a MPEG-I renderer outputs 16 frames i.e. 4096, the low latency transfer is required to deliver 17 frames of 240 sample size in order to avoid delay accumulation. This determines the transform processing, coding and transmission constraints for the low latency render adaptor operations.

The rendering of the MPEG-I to a determined intermediate format (e.g., LS, HOA) is shown in FIG. 5 by step 513.

Then the method can comprise adding a rendered audio spatial parameter (for example a position and orientation for the rendered intermediate format) as shown in FIG. 5 by step 514.

In some embodiments and as shown in FIG. 5 by step 515 the MPEG-I renderer output transformed in an intermediate format to low latency transfer input format (e.g., MASA).

The MPEG-I rendered output in MASA format is then encoded into an IVAS coded bitstream as shown in FIG. 5 by step 517.

The IVAS coded bitstream is delivered over a suitable network bit pipe to the UE as shown in FIG. 5 by step 519.

As shown in FIG. 5 step 521 (the UE) in some embodiments decodes the received IVAS coded bitstream.

Additionally in some embodiments as shown in FIG. 5 by step 523 the UE performs head tracked rendering of the decoded output with three degrees of rotational freedom.

Finally the UE sends the user translation information as position feedback message as an RTCP feedback message as shown in FIG. 5 by step 525. The renderer continues to render the scene with the new position obtained in 525, starting from step 513. In some embodiments, if there is a discrepancy in the user position and/or rotation information signalling due to network jitter, appropriate smoothening in the doppler processing.

Figure 6:
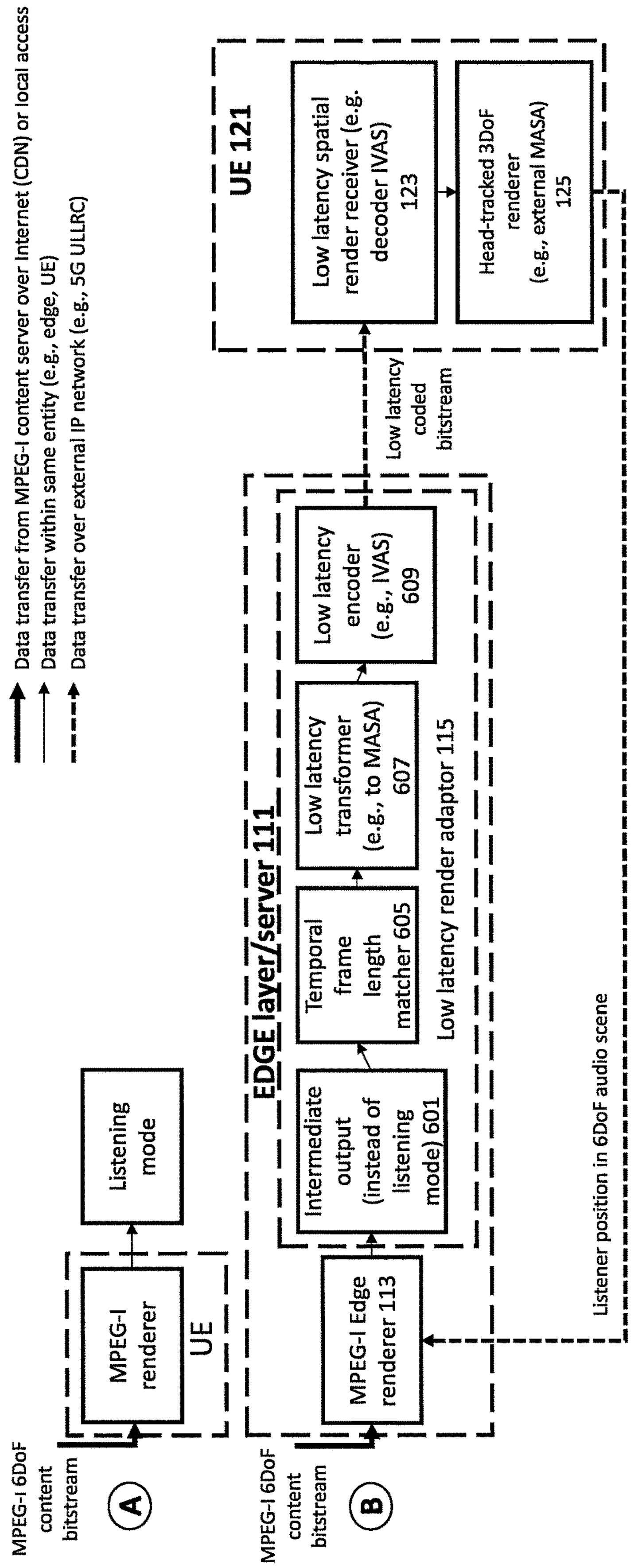
FIG. 6 shows the schematically a low latency render output as shown in FIG. 2 in further detail according to some embodiments.

With respect to FIG. 6, an example deployment of edge based rendering of MPEG-I 6DoF audio utilizing the 5G network slices which enable ULLRC is shown. The upper part of FIG. 6 shows a conventional application such as when the MPEG-I renderer within the UE determines that it is incapable to rendering the audio signals but is configured to determine the listening mode.

The lower part of the FIG. 6 shows the edge based rendering apparatus and furthermore shows an example of the low latency render adaptor 115 in further detail. The example low latency render adaptor 115 for example is shown comprising an intermediate output 601 configured to receive the output of the MPEG-I edge renderer 113 instead of a listening mode.

Furthermore the low latency render adaptor 115 comprises a temporal frame length matcher 605 configured to determine whether there is frame length differences between the MPEG-I output frames and the IVAS input frames and implement a suitable frame length compensation as discussed above.

Additionally the low latency render adaptor 115 is shown comprising a low latency transformer 607, for example, configured to convert the MPEG-I format signals to a MASA format signal.

Furthermore the low latency render adaptor 115 comprises a low latency (IVAS) encoder 609 configured to receive the MASA or suitable low latency format audio signals and encode them before outputting them as low latency coded bitstreams.

The UE as discussed above can comprise a suitable low latency spatial render receiver which comprises a low latency spatial (IVAS) decoder 123 which outputs the signal to a head-tracked renderer 125, which is further configured to perform head tracked rendering and further output the listener position to the MPEG-I edge renderer 113.

In some embodiments the listener/user (for example the user equipment) is configured to pass listener orientation values to the EDGE layer/server. However in some embodiments the EDGE layer/server is configured to implement a low latency rendering for a default or pre-determined orientation. In such embodiments the rotation delivery can be skipped by assuming a certain orientation for a session. For example, (0,0,0) for yaw pitch roll.

The audio data for the default or pre-determined orientation is then provided to the listening device on which a 'local' rendering performs panning to a desired orientation based on the listener's head orientation.

In other words, the example deployment leverages the conventional network connectivity represented by the black arrow in the conventional MPEG-I rendering as well as the 5G enabled ULLRC for edge based rendering as well as for delivery of user position and/or orientation feedback to the MPEG-I renderer over a low latency feedback link. It is noted that although the example shows 5G ULLRC, any other suitable network or communications link can be used. It is of significance that the feedback link need not require high bandwidth but prioritize low end to end latency because it is carrying feedback signal to create the rendering. Although the example shows IVAS as the low latency transfer codec, other low latency codecs can be used as well. In an embodiment of the implementation, the MPEG-I renderer pipeline is extended to incorporate the low latency transfer delivery as inbuilt rendering stages of the MPEG-I renderer (e.g., the block 601 can be part of MPEG-I renderer).

In the embodiments described above there is apparatus for generating an immersive audio scene with tracking but it may also be known as an apparatus for generating a spatialized audio output based on a listener or user position.

As detailed in the embodiments above an aim of these embodiments is to perform high quality immersive audio scene rendering without resource constraints and make the rendered audio available to resource constrained playback devices. This can be performed by leveraging the edge computing nodes which are connected via low latency connection between the edge computing node and the playback consumption device. To maintain responsiveness to the user movement low latency response is required. In spite of the low latency network connection, the embodiments aim to have low latency efficient coding of the immersive audio scene rendering output in intermediate format. The low latency coding assists in ensuring that added latency penalty is minimized for the efficient data transfer from the edge to the playback consumption device. The low latency coding is relative value compared to the overall permissible latency (including immersive audio scene rendering in the edge node, coding of the intermediate format output from the edge rendering, decoding of the coded audio, transmission latency). For example, the conversational codecs can have a coding and decoding latency of up to 32 ms. On the other hand, there are low latency coding techniques which can be up to 1 ms. The criteria employed in the codec selection in some embodiments is to have the transfer of the intermediate rendering output format to be delivered to the playback consumption device with minimal bandwidth requirement and minimal end to end coding latency.

Figure 7:
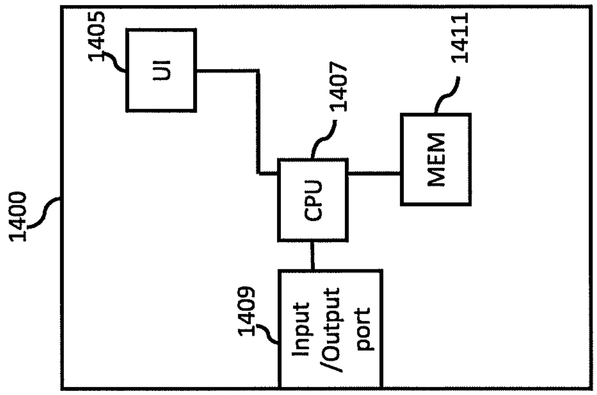
FIG. 7 shows schematically an example device suitable for implementing the apparatus shown.

With respect to FIG. 7 an example electronic device which may represent any of the apparatus shown above. The device may be any the end user operated suitable electronics device or apparatus. For example in some embodiments the device 1400 is a mobile device, user equipment, tablet computer, computer, audio playback apparatus, etc. However the example electronic device at least in part may represent the edge layer/server 111 or cloud layer/server 101 in the form of distributed computing resources.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:

at least one processor; and at least one memory storing instructions that, when executed with the at least one processor, cause the apparatus to:

obtain a user position value;

obtain at least one input audio signal and associated metadata enabling a rendering of the at least one input audio signal;

generate an intermediate format immersive audio signal based on the at least one input audio signal, the metadata, and the user position value;

process the intermediate format immersive audio signal to obtain at least one spatial parameter and at least one audio signal; and encode the at least one spatial parameter and the at least one audio signal, wherein the at least one spatial parameter and the at least one audio signal are configured to be used to at least in part generate a spatial audio output.

2. The apparatus as claimed in claim 1, wherein the instructions, when executed with the at least one processor, cause the apparatus to:

transmit the encoded at least one spatial parameter and the at least one audio signal to a further apparatus, wherein the further apparatus is configured to output a binaural or multichannel audio signal based on processing the at least one audio signal, the processing based on a user rotation value and the at least one spatial parameter.

3. The apparatus as claimed in claim 2, wherein the further apparatus is operated by a user and the obtained user position value is received from the further apparatus.

4. The apparatus as claimed in claim 1, wherein the instructions, when executed with the at least one processor, cause the apparatus to:

obtain the user position value based on receiving the user position value from a head mounted device.

5. The apparatus as claimed in claim 2, wherein the instructions, when executed with the at least one processor, cause the apparatus to:

transmit the user position value to the further apparatus.

6. The apparatus as claimed in claim 1, wherein processing the intermediate format immersive audio signal, to obtain the at least one spatial parameter and the at least one audio signal, comprises the instructions, when executed with the at least one processor, cause the apparatus to:

generate a metadata assisted spatial audio bitstream.

7. The apparatus as claimed in claim 1, wherein encoding the at least one spatial parameter and the at least one audio signal comprises the instructions, when executed with the at least one processor, cause the apparatus to:

generate an immersive voice and audio services bitstream.

8. The apparatus as claimed in claim 1, wherein processing the intermediate format immersive audio signal comprises the instructions, when executed with the at least one processor, cause the apparatus to:

determine an audio frame length difference between the intermediate format immersive audio signal and the at least one audio signal; and control a buffering of the intermediate format immersive audio signal based on the determined audio frame length difference.

9. The apparatus as claimed in claim 1, wherein the instructions, when executed with the at least one processor, cause the apparatus to:

obtain a user rotation value, wherein generating the intermediate format immersive audio signal comprises the instructions, when executed with the at least one processor, cause the apparatus to:

generate the intermediate format immersive audio signal further based on the user rotation value.

10. The apparatus as claimed in claim 2, wherein the generated intermediate format immersive audio signal is further based on a pre-determined or agreed user rotation value, wherein the further apparatus is configured to output the binaural or multichannel audio signal based on processing the at least one audio signal, the processing based on the user rotation value relative to the pre-determined or agreed user rotation value and the at least one spatial parameter.

11. The apparatus as claimed in claim 1, wherein the intermediate format immersive audio signal comprises a format selected based on an encoding compressibility of the intermediate format immersive audio signal.

12. An apparatus comprising:

at least one processor; and at least one memory storing instructions that, when executed with the at least one processor, cause the apparatus to:

obtain a user position value and a user rotation value;

obtain an encoded at least one audio signal and at least one spatial parameter, wherein the encoded at least one audio signal comprises at least one encoded audio signal that is based on processing of an intermediate format immersive audio signal that is generated based on at least one input audio signal and the user position value; and generate an output audio signal based on processing the encoded at least one audio signal, the at least one spatial parameter and the user rotation value for six-degrees-of-freedom audio rendering.

13. The apparatus as claimed in claim 12, wherein the apparatus is operated by a user, wherein obtaining the user position value comprises the instructions, when executed with the at least one processor, cause the apparatus to:

generate the user position value.

14. The apparatus as claimed in claim 12, wherein the obtained user position value is received from a head mounted device operated by a user.

15. The apparatus as claimed in claim 12, wherein the obtained encoded at least one audio signal and at least one spatial parameter, are received from a further apparatus.

16. The apparatus as claimed in claim 15, wherein the instructions, when executed with the at least one processor, cause the apparatus to:

receive the user position value and/or the user rotation value from the further apparatus.

17. The apparatus as claimed in claim 15, wherein the instructions, when executed with the at least one processor, cause the apparatus to:

transmit the user position value and/or the user rotation value to the further apparatus, wherein the further apparatus is configured to generate the intermediate format immersive audio signal based on the at least one input audio signal, metadata associated with the at least one input audio signal, and the user position value.

18. The apparatus as claimed in claim 16, wherein the further apparatus is further configured to process the intermediate format immersive audio signal to obtain the at least one spatial parameter and the at least one audio signal.

19. A method for an apparatus for generating a spatial audio output based on a user position, the method comprising:

obtaining a user position value;

obtaining at least one input audio signal and associated metadata enabling a rendering of the at least one input audio signal;

generating an intermediate format immersive audio signal based on the at least one input audio signal, the metadata, and the user position value;

processing the intermediate format immersive audio signal to obtain at least one spatial parameter and at least one audio signal; and encoding the at least one spatial parameter and the at least one audio signal, wherein the at least one spatial parameter and the at least one audio signal are configured to be used to at least in part generate the spatial audio output.

20. A method for an apparatus for generating a spatial audio output based on a user position, the method comprising:

obtaining a user position value and a user rotation value;

obtaining an encoded at least one audio signal and at least one spatial parameter, wherein the encoded at least one audio signal comprises at least one encoded audio signal that is based on processing of an intermediate format immersive audio signal that is generated based on at least one input audio signal and the user position value; and generating an output audio signal based on processing the encoded at least one audio signal, the at least one spatial parameter and the user rotation value for six-degrees-of-freedom audio rendering.

* * * * *